W. R. BUCKMAN.
ROTARY WEEDER.
APPLICATION FILED JUNE 11, 1910.

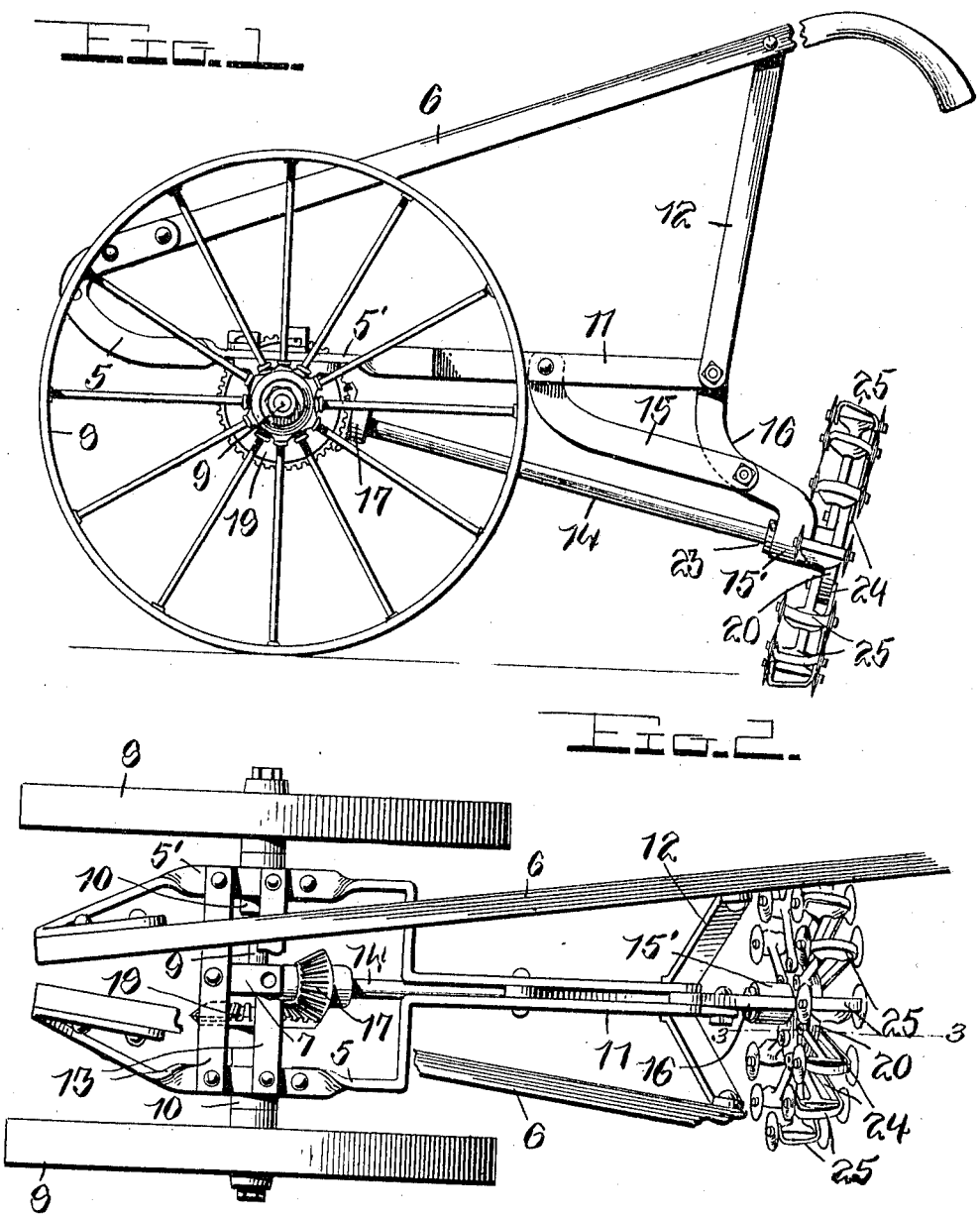

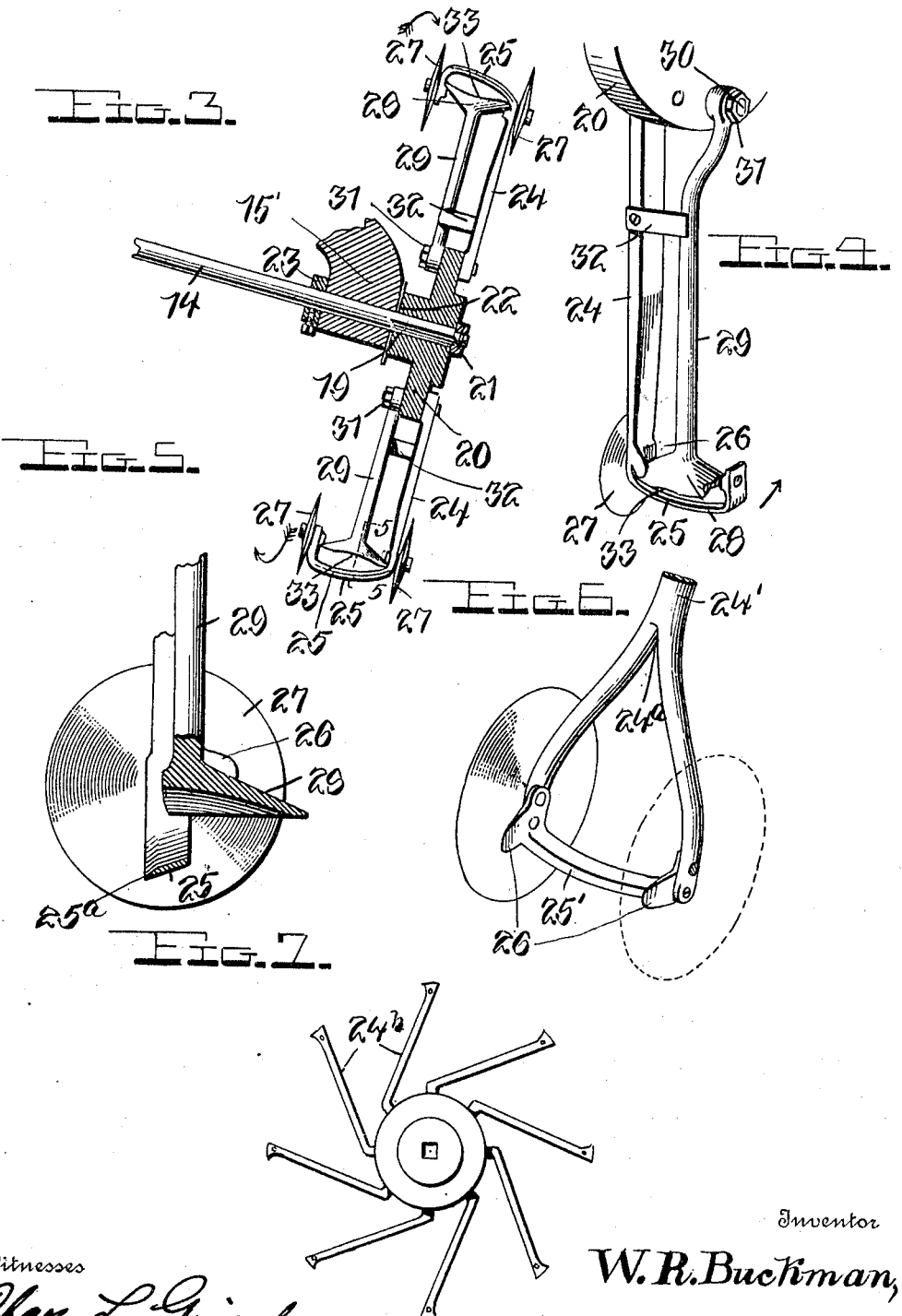

980,194.

Patented Jan. 3, 1911.
3 SHEETS—SHEET 3.

Witnesses
Chas. L. Griesbauer.
E. M. Ricketts

Inventor
W. R. Buckman,
By Watson E. Coleman,
Attorney

UNITED STATES PATENT OFFICE.

WALTER R. BUCKMAN, OF PHILADELPHIA, PENNSYLVANIA.

ROTARY WEEDER.

980,194.  Specification of Letters Patent.  Patented Jan. 3, 1911.

Application filed June 11, 1910. Serial No. 566,443.

*To all whom it may concern:*

Be it known that I, WALTER R. BUCKMAN, a citizen of the United States, residing at Byberry, Philadelphia, in the county of Philadelphia and State of Pennsylvania, have invented certain new and useful Improvements in Rotary Weeders, of which the following is a specification, reference being had to the accompanying drawings.

This invention relates to certain new and useful improvements in rotary weeders and has for its object to provide a machine of this character of very simple construction whereby the rows of plants may be thinned, suitable means being provided whereby the cutter knives will make a clean cut so that the plants which are left standing will not be torn.

Another object is to provide a rotating cutter head carrying a plurality of radiating arms or spokes each carrying a cutting knife, and means for preventing the soil being thrown upon the plants as the knives engage with the ground.

A further object is to provide a hand operated garden implement adapted to straddle the rows of plants, said implement having a plurality of cutting knives rotatably carried thereby, a guard disk being arranged at the end of each knife, and a yieldingly held guard plate arranged over the knife to prevent the soil being thrown outwardly by the same upon the adjacent plants.

With these and other objects in view, the invention consists of the novel features of construction, combination and arrangement of parts hereinafter fully described and claimed, and illustrated in the accompanying drawings, in which—

Figure 8:
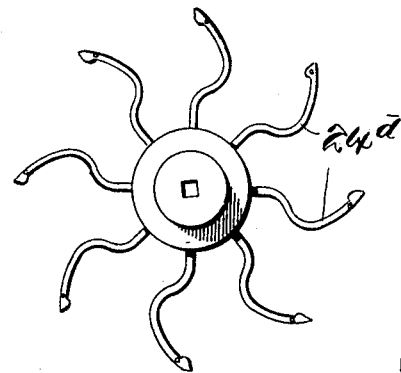
Figure 9:
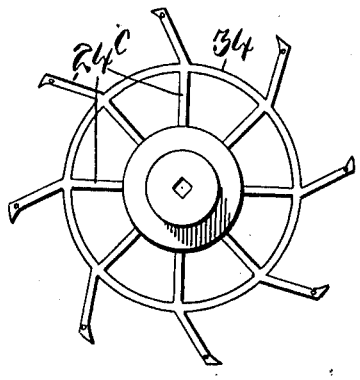

Figure 1 is a side elevation of a machine constructed in accordance with my invention; Fig. 2 is a top plan view thereof; Fig. 3 is an enlarged section taken on the line 3—3 of Fig. 2; Fig. 4 is an enlarged detail perspective view of one of the cutter head arms and guard member, one of the guard disks being removed; Fig. 5 is an enlarged detail section taken on the line 5—5 of Fig. 3; Fig. 6 is a detail perspective view of a slightly modified form of the cutter or chopping arms; Figs. 7, 8 and 9 are detail views of the cutter showing several modified arrangements of the chopping arms; Figs. 10, 11, 12, 13, and 14 are detail views of various forms of cutting plates which may be used in accordance with the particular purpose for which the machine is employed.

Referring more particularly to the drawings 5 indicates a frame which is secured to the ends of the handle bars 6. This frame is supported between the ground wheels 8 which are connected by the transverse axle 9. One or both of these drive wheels may be rigidly secured upon the axle. Bearings 10 are arranged upon the axle 9 upon which the frame bars 5' are secured. Suitable ball bearings may be arranged within the frame bearings 10 to reduce the friction thereon to a minimum. The frame bars 5' rearwardly of the wheel axle 9 are twisted and disposed in a vertical plane. They are then bent at right angles and extended inwardly to a point centrally between the drive wheels. The frame bars are extended rearwardly upon each other from this point as shown at 11. Adjacent to the rear ends of the frame bars the braces 12 are secured which extend upwardly and are secured to the handle 6. The frame bars 5' are braced and connected between the bearings 7 by means of the transverse bars 13.

An inclined shaft 14 is rotatably mounted beneath the frame of the machine. The rear end of this shaft is supported in a bearing 15' formed on the end of a rearwardly extending supporting bar 15, the other end of which is rigidly secured to the rearwardly extending portions 11 of the frame bars 5. A depending brace 16 is secured between the rear ends of the frame bars and bolted or otherwise secured to the supporting bar 15. The shaft 14 extends forwardly and upwardly from the bearing 15' and a pinion 17 is fixed on the forward end thereof. This pinion meshes with a beveled gear 18 fixed upon the axle 9. It will thus be obvious that as the machine is moved over the ground, the shaft 14 will be rotated through the medium of the gears 17 and 18. Adjacent to the rear lower end of the shaft 14 the same is formed with a squared portion 19. Upon this squared portion the cutting or chopping head 20 is arranged. The extremity of the shaft 14 is threaded to receive a nut 21. A pin 22 extends through the squared portion of the shaft with which the chopping head 20 engages. This pin spaces the hub portion of the cutter head from the bearing 15', so that said head is rigidly fixed on the end of the shaft 14 by threading the nut 21 inwardly on said shaft and clamping the head between said nut and the pin 22. A collar or flange 23 is formed upon the shaft 14 in advance of the bearing 15' and abuts against the end thereof. This flange prevents rearward movement of the shaft in its bearing so that the pinion 17 is at all times engaged with the teeth of the gear 18.

The cutter head 20 carries a plurality of radiating arms 24 upon the end of each of which a laterally extending cutting blade 25 is formed. These cutting arms and blades are clearly shown in Figs. 3, 4 and 5. It will be noted from reference to Fig. 3 that the cutting blades 25 formed on the ends of the arms are disposed at an obtuse angle to said arms so that their cutting edges lie in a plane substantially parallel with the ground surface whereby that part of the row which is cut out by said blades in the movement of the machine is crosswise of the row. In the preferred embodiment of my invention the outer ends of the arms 24 are each laterally extended and longitudinally curved or bowed. One of the longitudinal edges of the blade 25 is sharpened as at 25ª and from the other edge thereof and at each end of the same a finger 26 extends rearwardly and converge with respect to each other toward the center of the blade and at an angle with respect to the rear edge of the same. Upon each end of the blade 25 a cutting disk 27 is rotatably mounted. The fingers 26 act as guards and prevent the soil from flying outwardly from the ends of the cutting blade and upon the adjacent plants of the row so that the liability of the same being crushed is thus obviated. The cutting disks 27 insure a clean cut when the blades 25 are brought into contact with the plants. In this manner the edges of the plants which are left standing are not torn or mutilated so that no greater amount of the plants than is actually necessary is destroyed. In some instances it might be advisable to dispense with the disks 27 and it is principally owing to this fact that the guard fingers 26 are provided. When the disks are not employed, these guard fingers will effectually prevent the deflection of the larger particles of earth upon the plants at opposite ends of the cutter blades. It will be understood, however, that if desired both the disks and guard fingers may be employed to better provide against the possible injury to the plants when working in soft heavy ground, said guard fingers directing the earth inwardly after the cutting blades have been elevated to some distance above the plant row.

When the cutter head is rotated at high speed and the plants are small, not having attained their mature growth, the guard fingers 26 will not accomplish the above result and the forcible engagement of the cutting blade with the soil will throw the same up over the guard fingers upon the plants. In order to overcome this defect I provide the guard plate 28 which is curved or bowed longitudinally in a direction opposite to the plate 25. This guard plate 28 is formed on the end of a rod 29 which is disposed adjacent to the arm 24 and is pivoted at its inner end to the head 20 upon a stud 30 fixed to the head. The end of the stud is reduced and screw threaded to receive a nut 31 by means of which the rod 29 is secured thereon. The rod 29 is, however pivotally movable on said stud and is yieldingly held in its normal position by means of a leaf spring 32. This spring must be of sufficient tension to prevent forward or pivotal movement of the rod due to the centrifugal force occasioned by the rotation of the chopping head. As the cutting edge of the blade 25 engages the ground and disturbs the soil, the soil is held beneath the plate 28 and is held between the same and the knife blade until the knife leaves or moves above the ground. The accumulation of this soil will tend to force the guard plate 28 rearwardly from the cutter blade and when the blade is moved out of contact with the soil the spring 32 will immediately return the guard plate to its normal position. A certain amount of loosened soil escapes through the opening or mouth 33 which is provided by bowing the guard plate and the blade in opposite directions. It will, however, not be forcibly discharged from between the plate and blade so that all danger of the same being deposited beyond the ends of the cutter blade is entirely eliminated. It will of course be obvious that the cutting blades may be of any desired length so as to cut out a greater or less amount of material from the plant row. It will be understood that the cutting or chopping wheel is disposed directly over the center of the plant row, the ground wheels being positioned on either side thereof. The cutting knives or blades would preferably range in length from three-fourths of an inch to about eight inches and may be advantageously employed for the thinning of various kinds of vegetables which do not attain a great height such as carrots, beets, parsnips, onions, turnips, etc.

In Fig. 6 I have illustrated a slightly modified construction wherein the cutter arms 24' are branched or divided at 24ª, and are each in the form of a letter Y. The ends of the branched arms 24ª are connected by the cutter blades 25'. These cutter blades are similar to those of the preferred form with the exception that they are separately formed and are secured to the ends of the arms 24ª by means of screws, rivets or other suitable fastening devices. This construction is extremely strong and would preferably be used where the soil is rocky or covered with stumps of small trees. The two arms 24$^a$ to which the cutting blades are secured will prevent the breaking of the blades although their cutting edges may become badly broken. They can, however, be readily sharpened by means of suitable tools.

In Figs. 7, 8 and 9 I have illustrated several different arrangements of the cutting arms which may be utilized in various instances where such a construction might be particularly desirable. In Fig. 7 it will be noted the arms 24$^b$ are disposed tangentially with relation to the cutting head. This disposition of the arms provides a more forcible engagement of the cutting blades with the plants, and is more especially adapted for use where the plants are of a hardy character and have attained their full growth. Fig. 8 shows a slightly different arrangement of the arms and is merely illustrative of one of the many different forms which may be resorted to in carrying out my invention. In this form of my invention, the arms 24$^d$ are reversely curved intermediate of their ends, the end portions of the arms being curved in the same general direction. The construction of the cutter arms is thus materially strengthened and liability of breakage of the arms eliminated. In Fig. 9 the arms 24$^c$ are connected together intermediate of the periphery of the cutter head and the ends of the arms by means of the annulus 34 which is disposed concentrically with relation to the cutting head. The outer end portions of the arms 24$^c$ it will be noted are disposed at an angle with relation to their inner portions, but if found desirable they may be otherwise arranged, the principle of this form of the cutter residing in the fact that a very strong and rigid construction is provided by connecting the radial series of arms by means of the ring or annulus 34. With each of the forms of the radiating arms above set forth, my cutting means and guard devices are adapted to be used, and while I have specifically set forth the arrangements of the cutter arms which are best adapted for certain uses, it will be obvious that my invention may also be utilized in combination with many other forms which are particularly applicable for other purposes.

In each of the modified forms of my invention above described, the cutter disks and guard devices employed in connection with the main embodiment of the device are adapted to be used, and it will be readily understood from an inspection of the drawings that these disks and guards may be easily and quickly arranged in coöperative relation to the cutter arms.

Figure 10:
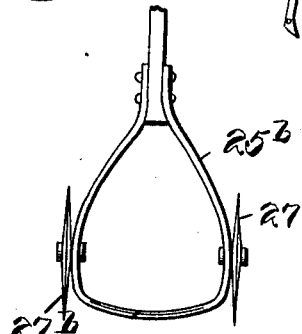
Figure 12:
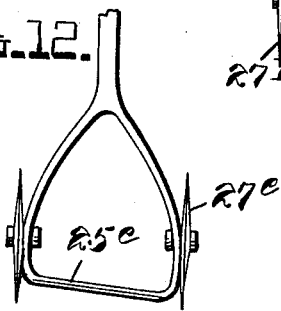
Figure 11:
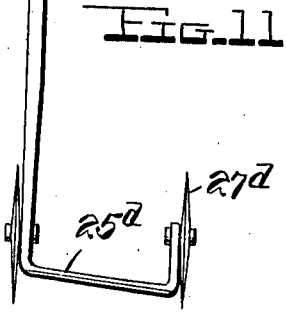
Figure 13:
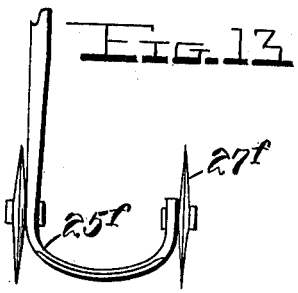
Figure 14:
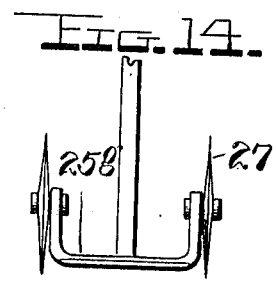

In Figs. 10 to 14 inclusive I have illustrated various forms of the knives or cutting blades. In Fig. 10, a metal loop 25$^b$ is shown secured at its ends to opposite sides of the cutter arms. The intermediate portion of this loop is sharpened to a cutting edge and upon the side portions thereof the cutting disks 27$^b$ are mounted. In Fig. 11 a cutter arm is shown which is substantially similar to the preferable form illustrated in Fig. 4, with the exception that the angular end portion 25$^d$ thereof is straight instead of bowed. The extremity of the arm which forms the cutting blade is turned up or bent into parallel relation to the main portion of the arm. The cutting disks 27$^d$ are arranged at the opposite ends of the blade in a similar manner to the previously described forms. In Fig. 12 the arm itself is branched or looped at its outer end, the intermediate portion thereof being straight to form the cutting blade 25$^e$. The disks 27$^e$ are mounted upon the opposed side portions of the loop. In Fig. 13 the end of the cutter arm is bent to describe substantially one continuous curve, thereby providing a blade 25$^f$ of greater curvature than the bowed blade of the main form of the device. Cutter disks 27$^f$ are arranged at the opposite ends of this cutting blade. All of these forms with the exception of that shown in Fig. 14 are adapted to be used in places where the soil is of a sandy nature. These knife blades are also adapted for the cutting of spaces in the plant rows of various sizes. The knife or cutting blade 25$^g$ shown in Fig. 14 it will be noted is disposed upon opposite sides of the arm, the ends thereof being formed in a manner similar to the preferred form of the blade upon which the cutter disks may be mounted. The cutter arm extending centrally between the ends of the blade will serve to break up and thoroughly disintegrate the earth so that when working in hard, stony ground, the liability of large particles of the soil which has become thoroughly baked and hardened, passing over the edges of the disk 27$^g$ is obviated. The guard plate, it will be understood, is disposed rearwardly of the arm in this form of the invention.

In each of the forms of the cutting blade set forth, the end disks 27 may be dispensed with if desired, but for working where the plants grow very thickly, these disks must be employed or the surrounding foliage will be seriously cut and the growth of the plants to maturity thereby rendered very doubtful.

It will be obvious that any desired number of arms 24 may be employed and that the principle involved is not dependent upon the particular number and arrangement of the arms as shown in the accompanying drawings. It will further be understood that while I have set forth the particular combination and arrangement of the various elements entering into the construction of the machine, they are susceptible of considerable variation in form, proportion and arrangement without departing from the essential features or sacrificing any of the advantages of the invention.

Having thus described the invention what is claimed is:—

1. In a machine of the character described, a rotary cutting member comprising a plurality of cutting blades, a cutting disk arranged on each end of said blades, and guard fingers formed on the blades between the cutting disks.

2. In a machine of the character described, a rotary cutting member comprising a plurality of cutting blades, rotary cutting disks coöperatively associated with said blades, and converging guard fingers formed on the blades between the disks.

3. In a machine of the character described, a rotary cutting member comprising a plurality of cutting blades, said blades each having a guard finger formed on each end, said guard fingers converging inwardly toward the center of the blade.

4. In a machine of the character described, a rotary cutting member comprising a plurality of spaced cutting blades, the ends of said blades being disposed at an angle and each having forwardly extending converging guard fingers formed thereon, the blade being longitudinally curved between said fingers.

5. In a machine of the character described, a rotary cutting member comprising a plurality of longitudinally curved cutting blades, said blades each having a rearwardly extending guard finger formed on each end thereof, said fingers being angularly disposed relative to the blade and an independently rotatable cutting disk mounted on each end of the blade beyond the guard fingers.

6. In a machine of the character described, a rotary cutting member comprising a plurality of spaced longitudinally curved cutting blades, an independently rotatable disk arranged on each end of the blades, and guard means carried by each blade, substantially as and for the purpose specified.

7. In a machine of the character described, a rotary cutter head, a plurality of arms carried by said head, a cutting blade on the end of each arm, and a movable yieldingly held guard member carried by the cutter head and associated with the cutting blade, substantially as and for the purpose specified.

8. In a machine of the character described, a cutting member comprising a plurality of cutting blades, and guard plates co-extensive in length with said blades and disposed entirely in the rear of their cutting edges.

9. In a machine of the character described, a cutting member comprising a plurality of cutting blades, and guard plates arranged approximately parallel to said blades and co-extensive in length therewith, said guard plates being disposed above the cutting edges of the blades.

10. In a machine of the character described, a rotary cutting member comprising a head, a plurality of radiating arms carried by said head, a cutting blade formed upon the end of each of the arms and extending at an angle thereto, and a yieldingly held guard plate disposed above and rearwardly of the cutting edge of the blade, substantially as and for the purpose specified.

11. In a machine of the character described, a rotary cutter head, a plurality of radiating arms fixed in said head, a laterally disposed longitudinally curved cutting blade formed on the end of each of the arms, and a guard plate disposed above and in the rear of the cutting edge of the blade and curved reversely with relation thereto, substantially as and for the purpose specified.

12. In a machine of the character described, a rotary cutter head, a plurality of radiating arms fixed in said head, a laterally extending longitudinally curved cutting blade formed on the end of each of said arms, a spring held guard plate associated with the cutter blade and curved reversely with relation thereto, and an independently rotatable cutting disk arranged at each end of the blade, substantially as and for the purpose specified.

13. In a machine of the character described, a rotary cutter head, a plurality of radiating arms fixed in said head, a cutting blade formed on the end of each arm, a rod pivoted at one end to the head, a guard plate formed on the end of said arm and associated with the cutting blade, and means carried by the arm engaging said rod to hold the guard plate yieldingly against movement, substantially as and for the purpose specified.

14. In a machine of the character described, a rotary cutter head, a plurality of radiating arms fixed in said head, a laterally extending bowed cutting blade formed on the end of each arm, a guard plate carried by the cutter head and bowed oppositely to the cutting blade, and a spring yieldingly holding said guard against movement with relation to the cutting blade, substantially as and for the purpose specified.

15. In a machine of the character described, a rotary cutter head, a plurality of radiating arms fixed in said head, a laterally extending bowed cutting blade formed on the end of each arm, guard fingers extending inwardly from each end of the blade, a rod pivoted at one end to the cutter head, a guard plate formed on the end of said arm and associated with the cutting blade, said plate being bowed oppositely to the blade and extending upon one side thereof, and a leaf spring secured to the arm and engaging said rod to hold the guard plate yieldingly against movement, substantially as and for the purpose specified.

16. In a machine of the character described, a rotary cutter head, a plurality of radiating arms fixed in said head, a cutting blade formed on the end of each arm and extending at an angle thereto, the end of said blade being disposed parallel to the arm, a rotary cutting disk mounted on said arm and the parallel end portion of the blade, and a guard plate extending rearwardly of the rear edge of the blade and coextensive therewith, and means yieldingly holding said guard plate against movement, substantially as and for the purpose specified.

17. In a machine of the character described, a rotary cutter head, a plurality of radiating arms fixed in said head, the end of each of said arms being laterally disposed and longitudinally bowed to form a cutting blade, the end of said blade being bent and disposed in parallel relation to the arm, a guard member pivoted to the cutter head and associated with the cutting blade, an independently rotatable cutting disk arranged on each end of the blade, and means carried by the arm for yieldingly holding the guard plate against movement, substantially as and for the purpose specified.

18. In a machine of the character described, a cutting member comprising a plurality of longitudinally curved cutting blades, and a yieldingly held guard plate coöperatively associated with each of the cutting blades and curved oppositely thereto.

19. In a machine of the character described, a rotary cutter head, a plurality of blades carried by the head, spaced cutter disks carried by the blade, and a plurality of yieldingly held guard members arranged on the cutter head and disposed between said disks.

20. In a machine of the character described, a rotary cutter head, a plurality of arms radiating from said head, an angularly disposed cutting blade carried by each of the arms, spaced cutting disks associated with said blades, movable guard members spaced from the blades and arranged between the disks, and means carried by the arms yieldingly holding said guard members between said disks.

21. In a machine of the character described, a cutter head, a plurality of arms carried by said head, an angularly disposed cutting blade carried by each of the arms, and guard members pivotally mounted on the cutter head yieldingly held in spaced relation to the cutting blades for movement relative thereto.

22. In a machine of the character described, a rotary cutter head, a plurality of cutting blades carried by said head, and yieldingly held movable guard members carried by the head and coöperatively associated with the cutting blades.

23. In a machine of the character described, a rotary cutter head, a plurality of spaced bowed cutting blades carried by the head, and a plurality of yieldingly held movable guard plates carried by the cutter head and associated with said cutting blades, said plates being bowed oppositely to the blades.

In testimony whereof I hereunto affix my signature in the presence of two witnesses.

WALTER R. BUCKMAN.

Witnesses:
  BENJ. W. SNYDER,
  ALBERT H. THEM.